(12) United States Patent
Yuan (10) Patent No.: US 10,616,543 B2
(45) Date of Patent: Apr. 7, 2020

(54) METHOD AND PROJECTOR FOR ADJUSTING PROJECTED IMAGE

(71) Applicant: ZTE CORPORATION, Shenzhen, Guangdong (CN)

(72) Inventor: Hongyue Yuan, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/309,492

(22) PCT Filed: Aug. 15, 2016

(86) PCT No.: PCT/CN2016/095348
§ 371 (c)(1),
(2) Date: Dec. 13, 2018

(87) PCT Pub. No.: WO2017/215108
PCT Pub. Date: Dec. 21, 2017

(65) Prior Publication Data
US 2019/0253677 A1  Aug. 15, 2019

(30) Foreign Application Priority Data

Jun. 14, 2016 (CN) .......................... 2016 1 0415396

(51) Int. Cl.
*H04N 9/31* (2006.01)

(52) U.S. Cl.
CPC .......... *H04N 9/3185* (2013.01); *H04N 9/317* (2013.01); *H04N 9/3182* (2013.01); *H04N 9/3194* (2013.01)

(58) Field of Classification Search
CPC ...... H04N 9/3185; H04N 9/3182; H04N 9/31; H04N 9/317; H04N 9/3188; G06T 3/40; G09G 5/02; G09G 3/2003; G09G 3/3607
(Continued)

(56) References Cited

U.S. PATENT DOCUMENTS

2008/0292304 A1  11/2008  Hirai
2014/0111536 A1*  4/2014  Shinozaki ............ H04N 9/3185
345/589

FOREIGN PATENT DOCUMENTS

CN  101040518 A  9/2007
CN  103650024 A  3/2014
(Continued)

OTHER PUBLICATIONS

WIPO, International Search Report dated Feb. 27, 2017.
CNIPA, First Office Action dated Apr. 8, 2019.

*Primary Examiner* — Sherrie Hsia
(74) *Attorney, Agent, or Firm* — Li & Cai Intellectual Property (USA) Office (57) ABSTRACT

Disclosed are a method and a projector for adjusting a projected image. The method may include steps of: photographing a coverage status of the projected image on a projection plane to obtain a photographed image; detecting the photographed image according to a preset boundary detection algorithm to determine a boundary condition within the projected image in the photographed image; and adjusting, according to the boundary condition within the projected image in the photographed image, the coverage status of the projected image on the projection plane by controlling an adjusting motor in the projector until the adjusted coverage status of the projected image on the projection plane is adapted to the projection plane.

11 Claims, 6 Drawing Sheets

(58) Field of Classification Search
USPC ......... 348/744–747, 806, 807; 345/617, 690, 345/698
See application file for complete search history.

(56) References Cited

FOREIGN PATENT DOCUMENTS

| CN | 104052976 A | 9/2014 |
| CN | 104750443 A | 7/2015 |

* cited by examiner

FIG. 1

| photograph a coverage status of the projected image on a projection plane to obtain a photographed image | ⟵ S201 |

| detect, according to a preset boundary detection algorithm, the photographed image to determine a boundary condition within the projected image in the photographed image | ⟵ S202 |

| adjust, according to the boundary condition within the projected image in the photographed image, the coverage status of the projected image on the projection plane by controlling an adjusting motor in the projector until the adjusted coverage status of the projected image on the projection plane is adapted to the projection plane | ⟵ S203 |

METHOD AND PROJECTOR FOR ADJUSTING PROJECTED IMAGE

TECHNICAL FIELD

The present disclosure relates to projection technology, and more particularly, to a method and projector for adjusting a projected image.

BACKGROUND

Currently, a projector generally projects, in a fixed size, an image onto a plane during operation process. When part of a region of the projection plane covered by a projected image is uneven, for example, a wall size may be smaller than the size of the projected image, the size of the projected image generally needs to be adjusted by adjusting a focal length of a lens in the projector manually in order to exclude the uneven part from the projected image. Thus, the region covered by the projected image can be ensured to be flat, thereby ensuring the viewing quality.

The requirement of manual adjustment increases operation difficulty of the projector for a user, and the manual adjustment requires repeated adjustments to obtain a suitable size for the projected image, which increases the operation complexity of the projector.

SUMMARY

In order to solve the above technical problem, embodiments of the present disclosure provide a method and projector for adjusting a projected image, which reduces the operation difficulty and complexity of adjusting the projected image of the projector.

An embodiment of the disclosure provides a method for adjusting a projected image, including steps of: photographing a coverage status of the projected image on a projection plane to obtain a photographed image, wherein a contrast between the projected image and the projection plane is greater than a preset threshold; detecting, according to a preset boundary detection algorithm, the photographed image to determine a boundary condition within the projected image in the photographed image; and adjusting, according to the boundary condition within the projected image in the photographed image, the coverage status of the projected image on the projection plane by controlling an adjusting motor in the projector until the adjusted coverage status of the projected image on the projection plane is adapted to the projection plane.

In an embodiment, the step of detecting, according to the preset boundary detection algorithm, the photographed image to determine the boundary condition within the projected image in the photographed image includes steps of: converting the photographed image into a corresponding grayscale image; convoluting, according to a preset matrix template, the grayscale image to obtain a boundary enhancement image corresponding to the photographed image; traversing a gray scale of each pixel of the boundary enhancement image; and determining, during the traversing process, a pixel with a gray scale greater than a preset gray scale threshold as a boundary point, and determining a pixel with a gray scale smaller than the preset gray scale threshold as a non-boundary point.

In an embodiment, the step of adjusting, according to the boundary condition within the projected image in the photographed image, the coverage status of the projected image on the projection plane by controlling the adjusting motor in the projector until the adjusted coverage status of the projected image on the projection plane is adapted to the projection plane includes steps of: reducing a size of the projected image, by controlling a zoom adjusting motor in the projector to adjust a focal length of an optical zoom lens of the projector in a preset first step length, when boundaries within the projected image in the photographed image includes all boundaries of the projection plane; photographing the coverage status of the projected image that has been reduced on the projection plane, and detecting the new photographed image according to the preset boundary detection algorithm; determining that the coverage status of the projected image that has been reduced on the projection plane is adapted to the projection plane, when there is no boundary within the projected image in the new photographed image; and reducing the size of the projected image that has been reduced, by controlling the zoom adjusting motor in the projector to adjust the focal length of the optical zoom lens of the projector in the preset first step length, when boundaries within the projected image in the new photographed image includes all boundaries of the projection plane.

In an embodiment, the step of adjusting, according to the boundary condition within the projected image in the photographed image, the coverage status of the projected image on the projection plane by controlling the adjusting motor in the projector until the adjusted coverage status of the projected image on the projection plane is adapted to the projection plane includes steps of: enlarging a size of the projected image, by controlling a zoom adjusting motor in the projector to adjust a focal length of an optical zoom lens of the projector in a preset second step length, when there is no boundary within the projected image in the photographed image; photographing the coverage status of the projected image that has been enlarged on the projection plane, and detecting the new photographed image according to the preset boundary detection algorithm; enlarging the size of the projected image that has been enlarged, by controlling the zoom adjusting motor in the projector to adjust the focal length of the optical zoom lens of the projector in the preset second step length, when there is no boundary within the projected image in the new photographed image; and adjusting the focal length of the optical zoom lens of the projector, by controlling the zoom adjusting motor, to a focal length of the optical zoom lens of the projector before enlarging the size of the projected image, when boundaries within the projected image in the new photographed image includes all boundaries of the projection plane.

In an embodiment, the step of adjusting, according to the boundary condition within the projected image in the photographed image, the coverage status of the projected image on the projection plane by controlling the adjusting motor in the projector until the adjusted coverage status of the projected image on the projection plane is adapted to the projection plane includes steps of: moving the projected image, when boundary within the projected image in the photographed image includes a single boundary of the projection plane, by controlling a position adjusting motor in the projector to adjust position of an optical zoom lens of the projector in a preset third step length in a direction opposite to the single boundary; photographing the coverage status of the projected image that has been moved on the projection plane, and detecting the new photographed image according to the preset boundary detection algorithm; determining that the coverage status of the projected image that has been moved on the projection plane is adapted to the projection plane, when there is no boundary within the projected image in the new photographed image; and moving the projected image that has been moved, when boundary within the projected image in the new photographed image includes the single boundary of the projection plane, by controlling the position adjusting motor in the projector to adjust the position of the optical zoom lens of the projector in the preset third step length in the direction opposite to the single boundary.

An embodiment of the disclosure provides a projector, including: an adjusting motor, an optical zoom lens, a photographing module, a detecting module, and an adjusting module, wherein the photographing module is configured to photograph a coverage status of the projected image on a projection plane to obtain a photographed image, wherein a contrast between the projected image and the projection plane is greater than a preset threshold; the detecting module is configured to detect, according to a preset boundary detection algorithm, the photographed image to determine a boundary condition within the projected image in the photographed image; and the adjusting module is configured to adjust, according to the boundary condition within the projected image in the photographed image, the coverage status of the projected image on the projection plane by controlling the adjusting motor in the projector until the adjusted coverage status of the projected image on the projection plane is adapted to the projection plane.

In an embodiment, the detecting module includes a converting sub-module, a convoluting sub-module, a traversing sub-module, and a determining sub-module, and wherein the converting sub-module is configured to convert the photographed image into a corresponding grayscale image; the convoluting sub-module is configured to convolute, according to a preset matrix template, the grayscale image to obtain a boundary enhancement image corresponding to the photographed image; the traversing sub-module is configured to traverse a gray scale of each pixel of the boundary enhancement image, and trigger the determining sub-module during the traversal process; and the determining sub-module is configured to determine a pixel with a gray scale greater than a preset gray scale threshold as a boundary point, and determine a pixel with a gray scale smaller than the preset gray scale threshold as a non-boundary point.

In an embodiment, the adjusting module is configured to: reduce a size of the projected image, by controlling a zoom adjusting motor in the projector to adjust a focal length of the optical zoom lens of the projector in a preset first step length, when boundaries within the projected image in the photographed image includes all boundaries of the projection plane; photograph the coverage status of the projected image that has been reduced on the projection plane, and detect the new photographed image according to the preset boundary detection algorithm; determine that the coverage status of the projected image that has been reduced on the projection plane is adapted to the projection plane, when there is no boundary within the projected image in the new photographed image; and reduce the size of the projected image that has been reduced, by controlling the zoom adjusting motor in the projector to adjust the focal length of the optical zoom lens of the projector in the preset first step length, when boundaries within the projected image in the new photographed image includes all boundaries of the projection plane.

In an embodiment, the adjusting module is configured to: enlarge a size of the projected image, by controlling a zoom adjusting motor in the projector to adjust a focal length of the optical zoom lens of the projector in a preset second step length, when there is no boundary within the projected image in the photographed image; photograph the coverage status of the projected image that has been enlarged on the projection plane, and detect the new photographed image according to the preset boundary detection algorithm; enlarge the size of the projected image that has been enlarged, by controlling the zoom adjusting motor in the projector to adjust the focal length of the optical zoom lens of the projector in the preset second step length, when there is no boundary within the projected image in the new photographed image; and adjust the focal length of the optical zoom lens of the projector, by controlling the zoom adjusting motor, to a focal length of the optical zoom lens of the projector before enlarging the size of the projected image, when boundaries within the projected image in the new photographed image includes all boundaries of the projection plane.

In an embodiment, the adjusting module is configured to: move the projected image, when boundary within the projected image in the photographed image includes a single boundary of the projection plane, by controlling a position adjusting motor in the projector to adjust position of the optical zoom lens of the projector in a preset third step length in a direction opposite to the single boundary; photograph the coverage status of the projected image that has been moved on the projection plane, and detect the new photographed image according to the preset boundary detection algorithm; determine that the coverage status of the projected image that has been moved on the projection plane is adapted to the projection plane, when there is no boundary within the projected image in the new photographed image; and move the projected image that has been moved, when boundary within the projected image in the new photographed image includes the single boundary of the projection plane, by controlling the position adjusting motor in the projector to adjust the position of the optical zoom lens of the projector in the preset third step length in the direction opposite to the single boundary.

An embodiment of the disclosure provides a computer storage medium storing executable instructions thereon, wherein the executable instructions are executed to implement the method for adjusting the projected image as described in above embodiments.

Embodiments of the disclosure provides a method and projector for adjusting a projected image, wherein the projected image can be automatically adjusted by detecting the coverage status of the projected image on the projection plane and adjusting the projected image according to the detected status, such that the projected image covers a suitable area on the projection plane, which reduces the operation difficulty and complexity of the projector.

DETAILED DESCRIPTION

Technical solutions of embodiments of the present disclosure will be clearly and fully described below with reference to the accompanying drawings.

Figure 1:
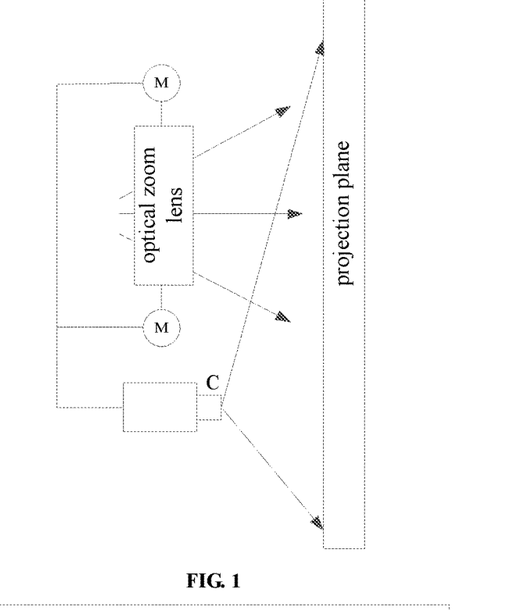
FIG. 1 is a schematic structural diagram of a projector according to an embodiment of the present disclosure.

Referring to the projector structure shown in FIG. 1, an adjusting motor for zoom adjustment and position adjustment of a optical zoom lens and an image processing device for photographing the coverage status of the projected image on the projection plane and for boundary detection are additionally provided in the projector structure shown in FIG. 1, such that the image processing device can perform boundary detection on the photographed image, and the adjusting motor can be controlled to perform the zoom adjustment or the position adjustment of the optical zoom lens according to a result of the detection. Through the above process, the projected image can be automatically adjusted to cover a suitable area on the projection plane, which reduces the operation difficulty and complexity of the projector.

Embodiment 1

Figure 2:
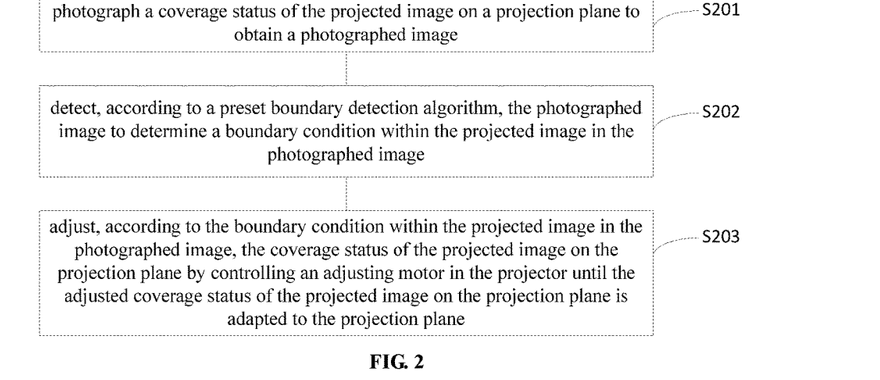
FIG. 2 is a schematic flowchart of a method for adjusting a projected image according to an embodiment of the present disclosure.

Based on the above projector structure, referring to FIG. 2, a method for adjusting a projected image according to an embodiment of the present disclosure is illustrated. The method may include steps 201 to 203.

At step S201, photographing a coverage status of the projected image on a projection plane to obtain a photographed image.

It can be understood that the technical solution of the embodiment can be used for projection test of a projector before actual projection, such that the projected image can cover a suitable area on the projection plane when the projector actually projects images after the test and adjustments. Therefore, in an embodiment, a contrast between the projected image and the projection plane is greater than a preset threshold. In the embodiment, for example, in a case where the projection plane is a white wall, the projected image may be a red or blue image with regular shape, such as a red circle, a blue rectangle, or the like, which is not specifically limited in embodiments of the disclosure.

At step S202, detecting, according to a preset boundary detection algorithm, the photographed image to determine a boundary condition within the projected image in the photographed image.

Figure 3A:
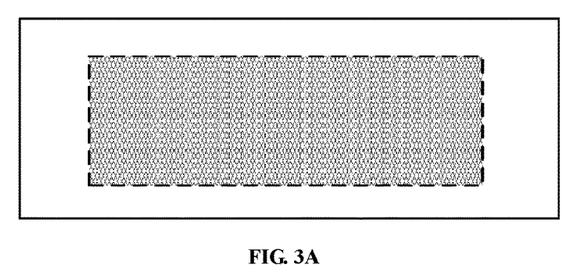
FIG. 3A is a schematic diagram of a photographed image according to an embodiment of the present disclosure.
Figure 3B:
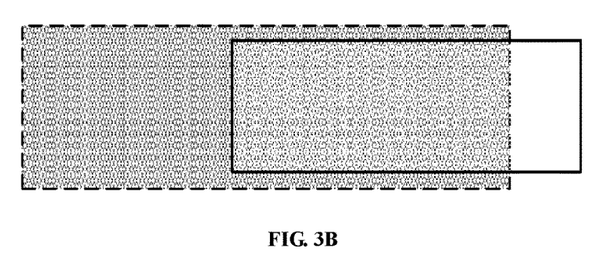
FIG. 3B is a schematic diagram of a photographed image according to another embodiment of the present disclosure.

It should be noted that when the size of the projected image exceeds the projection plane, or when the projected image deviates from a center of the projection plane by a large distance, a boundary of the projection plane may appear within the projected image in the photographed image, as shown in FIGS. 3A and 3B. In the photographed image shown in FIG. 3A, the white block defined by solid lines indicates the projected image, and the shaded block defined by dotted lines indicates the projection plane. When the size of the projected image is larger than the size of the projection plane, all boundaries of the projection plane may appear within the projected image in the photographed image. In the photographed image shown in FIG. 3B, the white block defined by solid lines indicates the projected image, and the shaded block defined by dotted lines indicates the projection plane. When the projected image deviates from the center of the projection plane, part of the boundaries of the projection plane may appear within the projected image in the photographed image. The boundaries within the projected image in the photographed image indicate that the coverage status of the projected image on the projection plane is not adapted to the projection plane, and the optical zoom lens of the projector needs to be adjusted according to step S203 described below, such that the coverage status of the projected image on the projection plane is adapted to the projection plane.

At step S203, adjusting, according to the boundary condition within the projected image in the photographed image, the coverage status of the projected image on the projection plane by controlling an adjusting motor in the projector until the adjusted coverage status of the projected image on the projection plane is adapted to the projection plane.

Through the above technical solution, the projector can automatically adjust the projected image, such that the projected image covers a suitable area on the projection plane, which reduces the operation difficulty and complexity of the projector.

Figure 4:
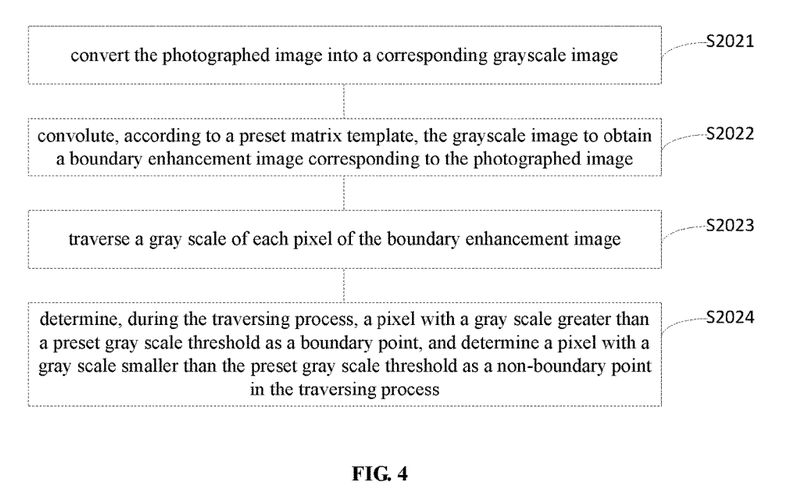
FIG. 4 is a schematic diagram of a boundary detection process according to an embodiment of the present disclosure.

Exemplarily, referring to FIG. 4, step S202 may specifically include steps S2021 to S2024.

At step S2021, converting the photographed image into a corresponding grayscale image.

At step S2022, convoluting, according to a preset matrix template, the grayscale image to obtain a boundary enhancement image corresponding to the photographed image.

At step S2023, traversing a gray scale of each pixel of the boundary enhancement image.

At step S2024, determining, during the traversing process, a pixel with a gray scale greater than a preset gray scale threshold as a boundary point, and determining a pixel with a gray scale smaller than the preset gray scale threshold as a non-boundary point.

For the above example, in a specific implementation process, the preset matrix template can be selected as $$\begin{bmatrix} -1 & -1 & -1 \\ -1 & 8 & -1 \\ -1 & -1 & -1 \end{bmatrix}.$$

It is to be understood that, in addition to the above examples, the technical solution of the present embodiment may also apply other boundary detection methods to determine the boundary condition within the projected image in the photographed image, which would not be specifically described in this embodiment.

Exemplarily, the boundary condition within the projected image in the photographed image can be obtained after step S202. The boundary condition within the projected image indicates that the size or position of the projected image is not adapted to the projection plane, thus the focal length or position of the optical zoom lens in the projector needs to be adjusted, such that the coverage status of the projected image on the projection plane is adapted to the projection plane.

Figure 5:
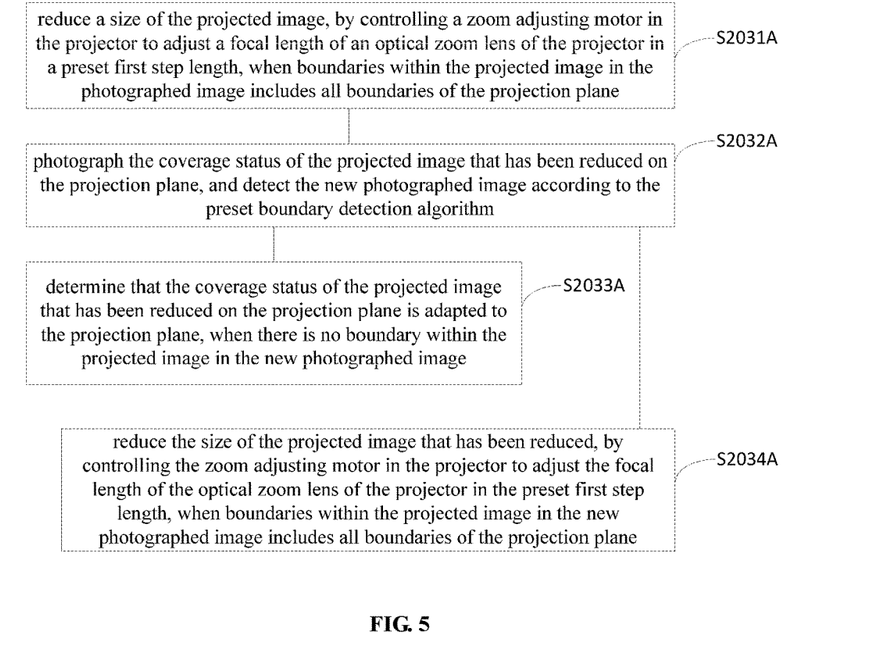
FIG. 5 is a schematic flowchart of adjusting a coverage status of a projected image on a projection plane according to an embodiment of the present disclosure.

Optionally, referring to FIG. 5, step S203 may specifically include steps S2031A to S2034A.

At step S2031A, reducing a size of the projected image, by controlling a zoom adjusting motor in the projector to adjust a focal length of an optical zoom lens of the projector in a preset first step length, when boundaries within the projected image in the photographed image includes all boundaries of the projection plane.

At step S2032A, photographing the coverage status of the projected image that has been reduced on the projection plane, and detecting the new photographed image according to the preset boundary detection algorithm.

At step S2033A, determining that the coverage status of the projected image that has been reduced on the projection plane is adapted to the projection plane, when there is no boundary within the projected image in the new photographed image.

At step S2034A, reducing the size of the projected image that has been reduced, by controlling the zoom adjusting motor in the projector to adjust the focal length of the optical zoom lens of the projector in the preset first step length, when boundaries within the projected image in the new photographed image includes all boundaries of the projection plane.

Figure 6:
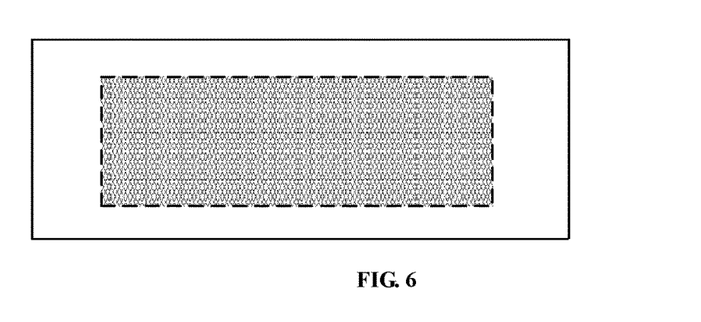
FIG. 6 is a schematic diagram of a photographed image according to another embodiment of the present disclosure.
Figure 7:
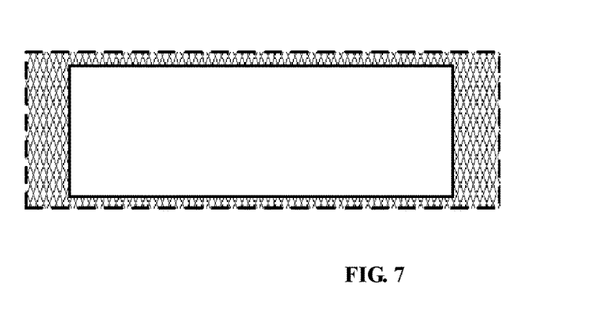
FIG. 7 is a schematic diagram of a photographed image according to another embodiment of the present disclosure.

In a specific implementation process, as shown in the schematic diagram of the photographed image shown in FIG. 6, the white block defined by solid lines indicates the projected image, and the shaded block defined by dotted lines indicates the projection plane. When the size of the projected image is relatively large, all boundaries of the projection plane may appear within the projected image in the photographed image. In this case, the size of the projected image may be reduced by controlling the zoom adjusting motor to adjust the focal length of the optical zoom lens of the projector in the first step length; the coverage status of the projected image that has been reduced on the projection plane may be photographed, and the new photographed image may be detected according to the above boundary detection algorithm. The boundary condition within the projected image in the new photographed image may be that there is no boundary of the projection plane, as shown in FIG. 7; or there are still all boundaries of the projection plane.

It can be understood that when there is no boundary of the projection plane within the projected image in the new photographed image, it can be determined that the coverage status of the projected image on the projection plane is adapted to the projection plane. When all boundaries of the projection plane are included within the projected image in the new photographed image, the size of the projected image may be further reduced by controlling the zoom adjusting motor to continuously adjust the focal length of the optical zoom lens of the projector, until there is no boundary of the projection plane within the projected image.

Figure 8:
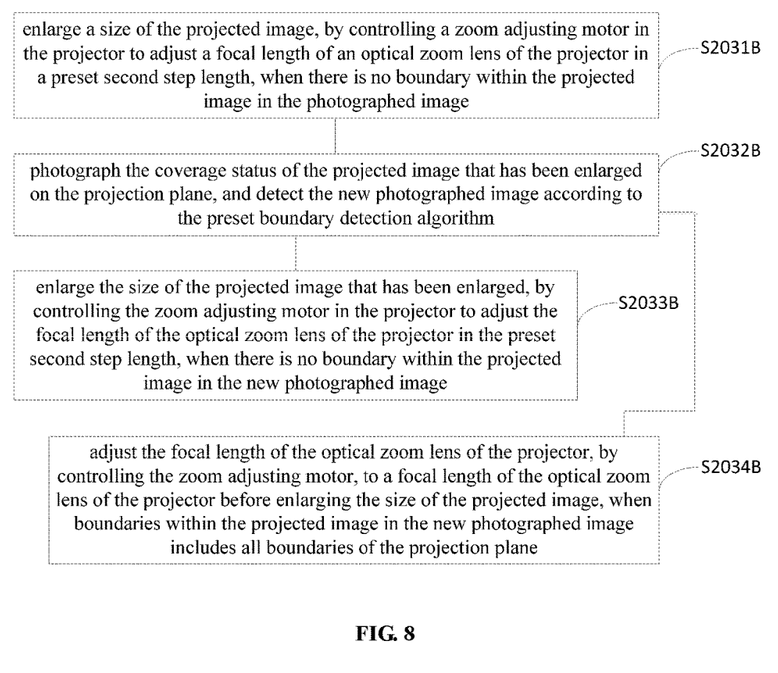
FIG. 8 is a schematic flowchart of adjusting a coverage status of a projected image on a projection plane according to another embodiment of the present disclosure.

Optionally, referring to FIG. 8, step S203 may specifically include steps S2031B to S2034B.

At step S2031B, enlarging a size of the projected image, by controlling a zoom adjusting motor in the projector to adjust a focal length of an optical zoom lens of the projector in a preset second step length, when there is no boundary within the projected image in the photographed image.

At step S2032B, photographing the coverage status of the projected image that has been enlarged on the projection plane, and detecting the new photographed image according to the preset boundary detection algorithm.

At step S2033B, enlarging the size of the projected image that has been enlarged, by controlling the zoom adjusting motor in the projector to adjust the focal length of the optical zoom lens of the projector in the preset second step length, when there is no boundary within the projected image in the new photographed image.

At step S2034B, adjusting the focal length of the optical zoom lens of the projector, by controlling the zoom adjusting motor, to a focal length of the optical zoom lens of the projector before enlarging the size of the projected image, when boundaries within the projected image in the new photographed image includes all boundaries of the projection plane.

Figure 9:
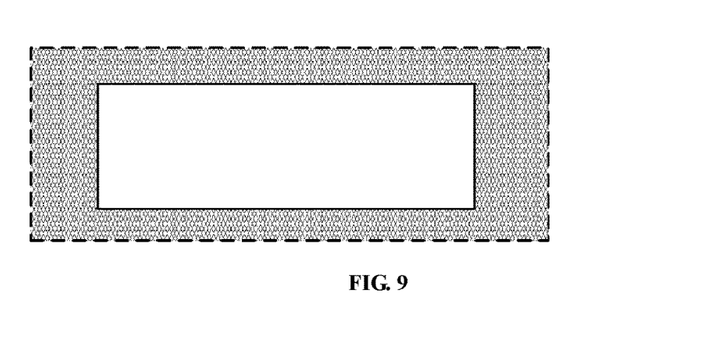
FIG. 9 is a schematic diagram of a photographed image according to another embodiment of the present disclosure.

In a specific implementation process, as shown in the schematic diagram of the photographed image shown in FIG. 9, the white block defined by solid lines indicates the projected image, and the shaded block defined by dotted lines indicates the projection plane. When the size of the projected image is relatively small, there will be no boundary of the projection plane appear within the projected image in the photographed image. In this case, the size of the projected image may be enlarged by controlling the zoom adjusting motor to adjust the focal length of the optical zoom lens of the projector in the second step length; the coverage status of the projected image that has been enlarged on the projection plane may be photographed, and the new photographed image may be detected according to the above boundary detection algorithm. The boundary condition within the projected image in the new photographed image may be that there is still no boundary of the projection plane, or there are all boundaries of the projection plane.

It can be understood that when there are all boundaries of the projection plane within the projected image in the new photographed image, it can be considered that the focal length of the optical zoom lens of the projector is suitable before the projected image is enlarged, and the coverage status of the projected image on the projection plane before the enlarging is adapted to the projection plane. When there is no boundary of the projection plane within the projected image in the new photographed image, the size of the projected image may be reduced by controlling a zoom adjusting motor to adjust the focal length of the optical zoom lens of the projector in the second step length, until the coverage status of the projected image on the projection plane is adapted to the projection plane.

Figure 10:
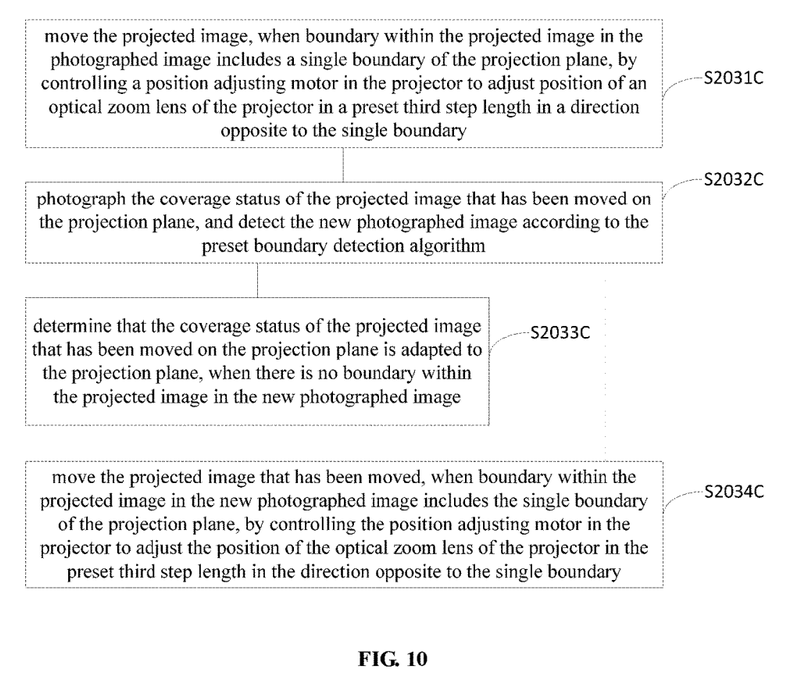
FIG. 10 is a schematic flowchart of adjusting a coverage status of a projected image on a projection plane according to another embodiment of the present disclosure.

Optionally, referring to FIG. 10, step S203 may specifically include steps S2031C to S2034C.

At step S2031C, moving the projected image, when boundary within the projected image in the photographed image includes a single boundary of the projection plane, by controlling a position adjusting motor in the projector to adjust position of an optical zoom lens of the projector in a preset third step length in a direction opposite to the single boundary.

At step S2032C, photographing the coverage status of the projected image that has been moved on the projection plane, and detecting the new photographed image according to the preset boundary detection algorithm.

At step S2033C, determining that the coverage status of the projected image that has been moved on the projection plane is adapted to the projection plane, when there is no boundary within the projected image in the new photographed image.

At step S2034C, moving the projected image that has been moved, when boundary within the projected image in the new photographed image includes the single boundary of the projection plane, by controlling the position adjusting motor in the projector to adjust the position of the optical zoom lens of the projector in the preset third step length in the direction opposite to the single boundary.

Figure 11:
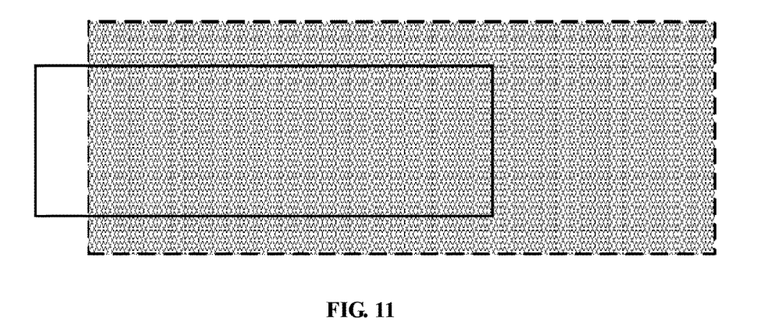
FIG. 11 is a schematic diagram of a photographed image according to another embodiment of the present disclosure.

In a specific implementation process, as shown in the schematic diagram of the photographed image shown in FIG. 11, the white block defined by solid lines indicates the projected image, and the shaded block defined by dotted lines indicates the projection plane. When the projected image is on the left relative to the projection plane, the left boundary of the projection plane appears within the projected image in the photographed image. In this case, the position of the projected image on the projection plane may be moved by controlling the position adjusting motor to adjust the position of the optical zoom lens in the third step length in a direction opposite to the left boundary; the coverage status of the projected image that has been moved on the projection plane may be photographed, and the new photographed image may be detected according to the above boundary detection algorithm. The boundary condition within the projected image in the new photographed image may be that there is still the left boundary of the projection plane, or there is no boundary of the projection plane.

It can be understood that when there is no boundary of the projection plane within the projected image in the new photographed image, it can be considered that the position of the optical zoom lens of projector is suitable at this time. When there is still the left boundary of the projection plane within the projected image in the new photographed image, the position of the projected image on the projection plane may be further moved by controlling the position adjusting motor to adjust the position of an optical zoom lens in the third step length, until the coverage status of the projected image that has been moved on the projection plane is adapted to the projection plane.

It should be noted that, the embodiment is described by taking the left boundary as an example of the single boundary, and in a case where the single boundary is a right boundary, the position adjusting motor adjusts the position of the optical zoom lens of the projector in the third step length in the direction opposite to the single boundary.

The embodiment of the disclosure provides a method for adjusting a projected image, wherein the projected image can be automatically adjusted by photographing and detecting the coverage status of the projected image on the projection plane and adjusting the projected image according to the coverage status, such that the adjusted coverage status of the projected image on the projection plane is adapted to the projection plane, and thereby, the projected image covers a suitable area on the projection plane, which reduces the operation difficulty and complexity of the projector.

Embodiment 2

Figure 12:
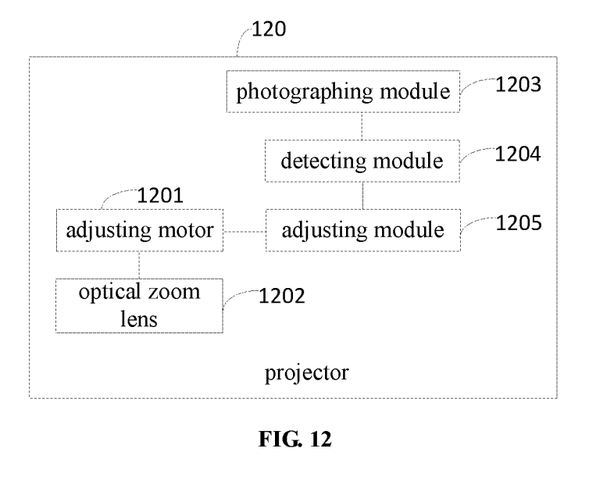
FIG. 12 is a schematic structural diagram of a projector according to an embodiment of the present disclosure.

Based on a same technical concept as the foregoing embodiment, referring to FIG. 12, a projector 120 is provided according to an embodiment of the present disclosure. The projector 120 includes an adjusting motor 1201 and an optical zoom lens 1202, and further includes a photographing module 1203, a detecting module 1204 and a adjusting module 1205.

The photographing module 1203 is configured to photograph a coverage status of the projected image on a projection plane to obtain a photographed image, wherein a contrast between the projected image and the projection plane is greater than a preset threshold.

The detecting module 1204 is configured to detect, according to a preset boundary detection algorithm, the photographed image to determine a boundary condition within the projected image in the photographed image.

The adjusting module 1205 is configured to adjust, according to the boundary condition within the projected image in the photographed image, the coverage status of the projected image on the projection plane by controlling the adjusting motor in the projector until the adjusted coverage status of the projected image on the projection plane is adapted to the projection plane.

It should be noted that, the adjusting motor 1201 may include a motor 1201A for zoom adjustment of the optical zoom lens (i.e., a zoom adjusting motor) and a motor 1201B for position adjustment of the optical zoom lens (i.e., a position adjusting motor).

Figure 13:
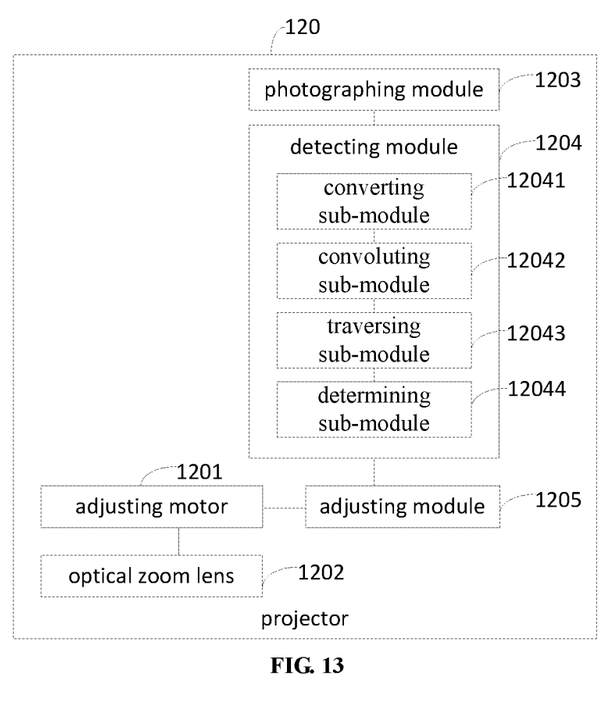
FIG. 13 is a schematic structural diagram of a projector according to another embodiment of the present disclosure.

In the above solution, referring to FIG. 13, the detecting module 1204 includes a converting sub-module 12041, a convoluting sub-module 12042, a traversing sub-module 12043, and a determining sub-module 12044.

The converting sub-module 12041 is configured to convert the photographed image into a corresponding grayscale image.

The convoluting sub-module 12042 is configured to convolute, according to a preset matrix template, the grayscale image to obtain a boundary enhancement image corresponding to the photographed image.

The traversing sub-module 12043 is configured to traverse a gray scale of each pixel of the boundary enhancement image, and trigger the determining sub-module 12044 during the traversal process.

The determining sub-module 12044 is configured to determine a pixel with a gray scale greater than a preset gray scale threshold as a boundary point, and determine a pixel with a gray scale smaller than the preset gray scale threshold as a non-boundary point.

In an embodiment, the adjusting module 1205 is configured to: reduce a size of the projected image, by controlling a zoom adjusting motor 1201A in the projector to adjust a focal length of the optical zoom lens 1202 of the projector in a preset first step length, when boundaries within the projected image in the photographed image includes all boundaries of the projection plane; photograph the coverage status of the projected image that has been reduced on the projection plane, and detect the new photographed image according to the preset boundary detection algorithm; determine that the coverage status of the projected image that has been reduced on the projection plane is adapted to the projection plane, when there is no boundary within the projected image in the new photographed image; and reduce the size of the projected image that has been reduced, by controlling the zoom adjusting motor 1201A in the projector to adjust the focal length of the optical zoom lens 1202 of the projector in the preset first step length, when boundaries within the projected image in the new photographed image includes all boundaries of the projection plane.

In an embodiment, the adjusting module 1205 is configured to: enlarge a size of the projected image, by controlling a zoom adjusting motor 1201A in the projector to adjust a focal length of the optical zoom lens 1202 of the projector in a preset second step length, when there is no boundary within the projected image in the photographed image; photograph the coverage status of the projected image that has been enlarged on the projection plane, and detect the new photographed image according to the preset boundary detection algorithm; enlarge the size of the projected image that has been enlarged, by controlling the zoom adjusting motor 1201A in the projector to adjust the focal length of the optical zoom lens 1202 of the projector in the preset second step length, when there is no boundary within the projected image in the new photographed image; and adjust the focal length of the optical zoom lens 1202 of the projector, by controlling the zoom adjusting motor 1201A, to a focal length of the optical zoom lens 1202 of the projector before enlarging the size of the projected image, when boundaries within the projected image in the photographed image includes all boundaries of the projection plane.

In an embodiment, the adjusting module 1205 is configured to: move the projected image, when boundary within the projected image in the photographed image includes a single boundary of the projection plane, by controlling a position adjusting motor 1201B in the projector to adjust position of the optical zoom lens 1202 of the projector in a preset third step length in a direction opposite to the single boundary; photograph the coverage status of the projected image that has been moved on the projection plane, and detect the new photographed image according to the preset boundary detection algorithm; determine that the coverage status of the projected image that has been moved on the projection plane is adapted to the projection plane, when there is no boundary within the projected image in the new photographed image; and move the projected image that has been moved, when boundary within the projected image in the new photographed image includes the single boundary of the projection plane, by controlling the position adjusting motor 1201B in the projector to adjust the position of the optical zoom lens 1202 of the projector in the preset third step length in the direction opposite to the single boundary.

The embodiment of the disclosure provides a projector 120, wherein the projected image can be automatically adjusted by photographing and detecting the coverage status of the projected image on the projection plane and adjusting the projected image according to the coverage status, such that the adjusted coverage status of the projected image on the projection plane is adapted to the projection plane, and the projected image covers a suitable area on the projection plane, which reduces the operation difficulty and complexity of the projector.

Those skilled in the art should appreciate that embodiments of the present disclosure can be provided as a method, system, or computer program product. Accordingly, the disclosure can be implemented in a form of a hardware, a software, or a combination thereof. Moreover, the disclosure can be implemented in a form of a computer program product embodied on one or more computer readable storage media (including but not limited to disk storage and an optical storage, etc.) storing computer readable program thereon.

The present disclosure is described with reference to flowchart and/or block diagrams of methods, apparatus (system), and computer program products according to embodiments of the disclosure. It should be understood that each process in the flowchart and/or each block in the block diagrams and/or a combination of the processes in the flowchart and/or blocks in the block diagrams can be implemented by computer program instructions. These computer program instructions can be provided to a general purpose computer, a special purpose computer, an embedded processor, or a processor of other programmable data processing device to produce a machine, such that a processor of a computer or other programmable data processing device executing the instructions produces an apparatus for implementing the functions specified in one or more processes of the flowchart or one or more blocks of the block diagrams.

These computer program instructions can also be stored in a computer readable memory that direct a computer or other programmable data processing device to operate in a particular manner, such that the instructions stored in the computer readable memory produce an article of manufacture including an instruction-based device configured to implement the functions specified in one or more processes of the flowchart or one or more blocks of the block diagrams.

These computer program instructions can also be loaded onto a computer or other programmable data processing device, such that a series of operational steps are performed on the computer or other programmable device to produce computer-implemented processing, and the computer or other programmable device executing the instructions provide steps for implementing the functions specified in one or more processes of the flowchart or one or more blocks of the block diagrams.

The above embodiments are merely exemplary embodiments of the present disclosure, and are not intended to limit the scope of the present disclosure.

INDUSTRIAL APPLICABILITY

The above technical solutions provided by embodiments of the disclosure can be applied to a process for adjusting a projected image, wherein the projected image can be automatically adjusted by detecting the coverage status of the projected image on the projection plane and adjusting the projected image according to the detected status, such that the projected image covers a suitable area on the projection plane, which reduces the operation difficulty and complexity of a projector.

What is claimed is:
1. A method for adjusting a projected image, comprising steps of:
   photographing a coverage status of the projected image on a projection plane to obtain a photographed image, wherein a contrast between the projected image and the projection plane is greater than a preset threshold;
   detecting, according to a preset boundary detection algorithm, the photographed image to determine a boundary condition within the projected image in the photographed image; and
   adjusting, according to the boundary condition within the projected image in the photographed image, the coverage status of the projected image on the projection plane by controlling an adjusting motor in a projector until the adjusted coverage status of the projected image on the projection plane is adapted to the projection plane.

2. The method of claim 1, wherein the step of detecting, according to the preset boundary detection algorithm, the photographed image to determine the boundary condition within the projected image in the photographed image comprises steps of:
   converting the photographed image into a corresponding grayscale image;

convoluting, according to a preset matrix template, the grayscale image to obtain a boundary enhancement image corresponding to the photographed image;

traversing a gray scale of each pixel of the boundary enhancement image; and determining, during the traversing process, a pixel with a gray scale greater than a preset gray scale threshold as a boundary point, and determining a pixel with a gray scale smaller than the preset gray scale threshold as a non-boundary point.

3. The method according to claim 1, wherein the step of adjusting, according to the boundary condition within the projected image in the photographed image, the coverage status of the projected image on the projection plane by controlling the adjusting motor in the projector until the adjusted coverage status of the projected image on the projection plane is adapted to the projection plane comprises steps of:

reducing a size of the projected image, by controlling a zoom adjusting motor in the projector to adjust a focal length of an optical zoom lens of the projector in a preset first step length, when boundaries within the projected image in the photographed image comprises all boundaries of the projection plane;

photographing the coverage status of the projected image that has been reduced on the projection plane, and detecting the new photographed image according to the preset boundary detection algorithm;

determining that the coverage status of the projected image that has been reduced on the projection plane is adapted to the projection plane, when there is no boundary within the projected image in the new photographed image; and reducing the size of the projected image that has been reduced, by controlling the zoom adjusting motor in the projector to adjust the focal length of the optical zoom lens of the projector in the preset first step length, when boundaries within the projected image in the new photographed image comprises all boundaries of the projection plane.

4. The method according to claim 1, wherein the step of adjusting, according to the boundary condition within the projected image in the photographed image, the coverage status of the projected image on the projection plane by controlling the adjusting motor in the projector until the adjusted coverage status of the projected image on the projection plane is adapted to the projection plane comprises steps of:

enlarging a size of the projected image, by controlling a zoom adjusting motor in the projector to adjust a focal length of an optical zoom lens of the projector in a preset second step length, when there is no boundary within the projected image in the photographed image;

photographing the coverage status of the projected image that has been enlarged on the projection plane, and detecting the new photographed image according to the preset boundary detection algorithm;

enlarging the size of the projected image that has been enlarged, by controlling the zoom adjusting motor in the projector to adjust the focal length of the optical zoom lens of the projector in the preset second step length, when there is no boundary within the projected image in the new photographed image; and adjusting the focal length of the optical zoom lens of the projector, by controlling the zoom adjusting motor, to a focal length of the optical zoom lens of the projector before enlarging the size of the projected image, when boundaries within the projected image in the new photographed image comprises all boundaries of the projection plane.

5. The method according to claim 1, wherein the step of adjusting, according to the boundary condition within the projected image in the photographed image, the coverage status of the projected image on the projection plane by controlling the adjusting motor in the projector until the adjusted coverage status of the projected image on the projection plane is adapted to the projection plane comprises steps of:

moving the projected image, when boundary within the projected image in the photographed image comprises a single boundary of the projection plane, by controlling a position adjusting motor in the projector to adjust position of an optical zoom lens of the projector in a preset third step length in a direction opposite to the single boundary;

photographing the coverage status of the projected image that has been moved on the projection plane, and detecting the new photographed image according to the preset boundary detection algorithm;

determining that the coverage status of the projected image that has been moved on the projection plane is adapted to the projection plane, when there is no boundary within the projected image in the new photographed image; and moving the projected image that has been moved, when boundary within the projected image in the new photographed image comprises the single boundary of the projection plane, by controlling the position adjusting motor in the projector to adjust the position of the optical zoom lens of the projector in the preset third step length in the direction opposite to the single boundary.

6. A non-transitory computer readable storage medium storing computer executable instructions, the computer executable instructions are configured to perform the method according to claim 1.

7. A projector, comprising an adjusting motor and an optical zoom lens, and further comprising a photographing module, a detecting module, and an adjusting module, wherein the photographing module is configured to photograph a coverage status of the projected image on a projection plane to obtain a photographed image, wherein a contrast between the projected image and the projection plane is greater than a preset threshold;

the detecting module is configured to detect, according to a preset boundary detection algorithm, the photographed image to determine a boundary condition within the projected image in the photographed image; and the adjusting module is configured to adjust, according to the boundary condition within the projected image in the photographed image, the coverage status of the projected image on the projection plane by controlling the adjusting motor in the projector until the adjusted coverage status of the projected image on the projection plane is adapted to the projection plane.

8. The projector of claim 7, wherein the detecting module comprises a converting sub-module, a convoluting sub-module, a traversing sub-module, and a determining sub-module, and wherein the converting sub-module is configured to convert the photographed image into a corresponding grayscale image;

the convoluting sub-module is configured to convolute, according to a preset matrix template, the grayscale image to obtain a boundary enhancement image corresponding to the photographed image;

the traversing sub-module is configured to traverse a gray scale of each pixel of the boundary enhancement image, and trigger the determining sub-module during the traversal process; and the determining sub-module is configured to determine a pixel with a gray scale greater than a preset gray scale threshold as a boundary point, and determine a pixel with a gray scale smaller than the preset gray scale threshold as a non-boundary point.

9. The projector of claim 7, wherein the adjusting module is configured to:

reduce a size of the projected image, by controlling a zoom adjusting motor in the projector to adjust a focal length of the optical zoom lens of the projector in a preset first step length, when boundaries within the projected image in the photographed image comprises all boundaries of the projection plane;

photograph the coverage status of the projected image that has been reduced on the projection plane, and detect the new photographed image according to the preset boundary detection algorithm;

determine that the coverage status of the projected image that has been reduced on the projection plane is adapted to the projection plane, when there is no boundary within the projected image in the new photographed image; and reduce the size of the projected image that has been reduced, by controlling the zoom adjusting motor in the projector to adjust the focal length of the optical zoom lens of the projector in the preset first step length, when boundaries within the projected image in the new photographed image comprises all boundaries of the projection plane.

10. The projector of claim 7, wherein the adjusting module is configured to:

enlarge a size of the projected image, by controlling a zoom adjusting motor in the projector to adjust a focal length of the optical zoom lens of the projector in a preset second step length, when there is no boundary within the projected image in the photographed image;

photograph the coverage status of the projected image that has been enlarged on the projection plane, and detect the new photographed image according to the preset boundary detection algorithm;

enlarge the size of the projected image that has been enlarged, by controlling the zoom adjusting motor in the projector to adjust the focal length of the optical zoom lens of the projector in the preset second step length, when there is no boundary within the projected image in the new photographed image; and adjust the focal length of the optical zoom lens of the projector, by controlling the zoom adjusting motor, to a focal length of the optical zoom lens of the projector before enlarging the size of the projected image, when boundaries within the projected image in the new photographed image comprises all boundaries of the projection plane.

11. The projector of claim 7, wherein the adjusting module is configured to:

move the projected image, when boundary within the projected image in the photographed image comprises a single boundary of the projection plane, by controlling a position adjusting motor in the projector to adjust position of the optical zoom lens of the projector in a preset third step length in a direction opposite to the single boundary;

photograph the coverage status of the projected image that has been moved on the projection plane, and detect the new photographed image according to the preset boundary detection algorithm;

determine that the coverage status of the projected image that has been moved on the projection plane is adapted to the projection plane, when there is no boundary within the projected image in the new photographed image; and move the projected image that has been moved, when boundary within the projected image in the new photographed image comprises the single boundary of the projection plane, by controlling the position adjusting motor in the projector to adjust the position of the optical zoom lens of the projector in the preset third step length in the direction opposite to the single boundary.

* * * * *